(12) United States Patent
Wilke et al.

(10) Patent No.: US 6,292,131 B1
(45) Date of Patent: Sep. 18, 2001

(54) APPARATUS AND METHOD FOR LIQUID LEVEL MEASUREMENT AND CONTENT PURITY MEASUREMENT IN A SOUNDING TUBE

(75) Inventors: Neil T. Wilke, Hamilton; Michael L. Topputo, West Chester, both of OH (US)

(73) Assignee: Ohmart - Vega, Inc., Cincinnati, OH (US)

( * ) Notice: Subject to any disclaimer, the term of this patent is extended or adjusted under 35 U.S.C. 154(b) by 0 days.

(21) Appl. No.: 09/675,930

(22) Filed: Sep. 29, 2000

Related U.S. Application Data

(63) Continuation-in-part of application No. 09/491,555, filed on Jan. 26, 2000.

(51) Int. Cl.$^7$ .............................. G01S 13/08; G01S 15/08; G01F 23/00

(52) U.S. Cl. ............................ 342/124; 367/99; 367/908; 73/290 V

(58) Field of Search .................... 367/99, 908; 342/123, 342/124; 73/290 R, 291, 290 V

(56) References Cited

U.S. PATENT DOCUMENTS 4,170,765 * 10/1979 Austin et al. ........................... 367/99

* cited by examiner

Primary Examiner—Ian J. Lobo
(74) Attorney, Agent, or Firm—Wood, Herron & Evans, L.L.P.

(57) ABSTRACT

A level sensing apparatus for attachment to a sounding tube in order to measure levels of contents in a tank and for determining the purity of contents in a tank. This level sensing apparatus includes a housing for enclosing the various components of the level sensing apparatus. The level sensing apparatus of the present invention also includes a sounding tube adapter operatively connected to the housing and is further adapted for attachment to a sounding tube. Additionally, the level sensing apparatus includes a lock operatively connected to the sounding tube adapter and capable of receiving the housing. Finally, the level sensing apparatus includes a swivel connector operatively connected to the housing, whereby the housing is capable of moving cooperatively with the swivel connector. In use, the level sensing apparatus of the present invention allows for pulse radar measurement of liquid levels in the tank or may be moved relative to the sounding tube to allow for manual sampling to test the purity of tank contents.

31 Claims, 4 Drawing Sheets

APPARATUS AND METHOD FOR LIQUID LEVEL MEASUREMENT AND CONTENT PURITY MEASUREMENT IN A SOUNDING TUBE

CROSS REFERENCE TO RELATED APPLICATION

This application is a C.I.P of copending U.S. patent application Ser. No. 09/491,555, filed on Jan. 26, 2000 filed by the same inventors and having the same assignee as the present application.

FIELD OF THE INVENTION

The present invention relates to an apparatus and method for pulse radar measurement of liquid levels within process and storage tanks and of determining the purity of liquids within process and storage tanks.

BACKGROUND OF THE INVENTION

In many environments, various materials are stored and/or processed in tanks prior to or during their disposition. These materials include foods, beverages, pharmaceuticals and fuels. One particular and commonly-known use of such tanks involves the storage of fuel for various modes of transportation. These fuel tanks can range from a gas tank on a car to voluminous fuel tanks such as those located on Naval ships. In particular, aircraft carriers house multiple fuel tanks. These are used to store jet fuel for the aircraft carried on the ship.

Regarding these fuel tanks on Naval ships, the ability to reliably determine the amount and purity of the contents stored within a tank at any given time can be critical. Military readiness is often dependent on an adequate fuel supply. Additionally, accurate measurements of fuel usage directly translate into cost effectiveness in procuring a fuel supply for ships. As such, there are several benefits to accurately and reliably gauging the levels of fuel in these tanks. Thus, the Navy measures to determine fuel levels. Additionally, the operation of high-performance jets is dependent on a low level of impurities in the fuel. Contaminates in the fuel can cause damage to many components of jets and can disrupt the performance of the jets in a manner that is hazardous to the occupants. Thus, the Navy frequently measures the purity of fuel within storage tanks.

Methods for the determination of liquid levels may include visual examination or the use of various apparatus that gauge the level of the fuel. Current electronic measurement methods include differential pressure and magnetic float transmitter technologies, both of which rely on sensor contact with the process medium. However, several factors, both in the structure of the tanks and in the methods of measurement used, increase the difficulty in obtaining an accurate and reliable level reading. In the particular situation of jet fuel tanks of Navy ships, any visual reading is obstructed by the location of the tanks within the bowels of the ship and by the voluminous size of the tanks. Additionally, visual inspection of content levels lacks accuracy and can be time consuming. In order to avoid the problems attendant visual examination, various apparatus may be used to measure content levels in fuel storage tanks.

For example, differential pressure transmitters measure static pressure head of the liquid in the tank and pressure (if any) of gases above the liquid. The arithmetic difference between these values is used to determine the liquid level. This is an inherently unreliable and inaccurate method because it depends on sensor location, ship motion and is an "inferred" level based on two other measurements.

Another example includes magnetic floats which are mechanical in nature and involve a ball or buoy floating on the surface of the liquid, typically in a guide or sleeve mounted to the tank wall. These systems require cumbersome incremental metered filling of the tank to establish electrical resistance values that correspond to tank level. They are also prone to clogging failures which require expensive invasive repair work.

Other problems with accuracy arise from a method commonly used to measure fuel level on Naval ships. By this method, the top of the sounding tube is opened. A plumb bob is then dropped through the interior of the sounding tube to the bottom of the sounding tube. Once the plumb bob is retracted from the bottom of the sounding tube using the plumb line, the liquid level may be read from the moisture level created by the fuel on the plumb line. However, may problems arise from this method of liquid level measurement. First, jet fuel is clear and evaporates very rapidly, thereby enhancing the difficulty of accurately reading the plumb line to determine the associated moisture level. Second, the plumb bob may break off the plumb line during use. Due to the difficulty involved, as a practical matter detached plumb bobs are not retrieved from sounding tubes. As a result, subsequent plumb bobs used for measurement may be impeded from falling to the bottom of the sounding tube, resulting in reduced measurement range.

In order to overcome the drawbacks of current methods of liquid level measurement used by the Navy, Applicants, in above-referenced U.S. patent application Ser. No. 09/491, 555, disclose the use of a level sensing gauge adapted to be operatively connected to a sounding tube for quickly and reliably determining fuel levels in storage tanks. The level sensing apparatus includes a latch door which seals off an orifice through which a plumb bob may be inserted to be employed as a redundant method of measurement.

While the use of a level sensing gauge on a sounding tube has proven adequate for measuring the liquid level of contents of storage tanks, one drawback of the invention is that it does not allow for samples of tank contents to be collected in order to determine their purity.

The purity of fuel stored on Naval ships is determined by a method commonly referred to as "thief sampling". In this process, an elongate hollow tube, or "thief sampler", is dropped into the contents of a tank. Fuel from the tank fills the hollow recess of the thief sampler. The thief sampler is then retracted and the purity of the collected sample is measured by methods well known in the art.

One drawback of the use of a level sensing apparatus on a sounding tube is that the apparatus closes off the end of the sounding tube, thereby preventing a thief sampler from being inserted to collect samples from the tank. As a result, in order to obtain a sample of fuel, the level sensing apparatus must first be removed from the sounding tube. This is a time consuming and laborious process. After the level sensing apparatus has been removed from the sounding tube, it must be set aside while the sample is being collected. This requires placing this highly sensitive piece of equipment on the deck of the ship. In this location, the level sensing gauge is vulnerable to damage. Finally, after a sample has been taken, the level sensing gauge must be reattached to the sounding tube. Not only is this time consuming, but the process may additionally require a recalibration of the level sensing gauge.

Another drawback to the use of a level sensing gauge on a sounding tube is that, due to its size and elongate shape, the thief sampler is not amenable to insertion through an orifice in the housing of the level sensing gauge. In order to take advantage of an orifice of sufficient size disposed in the housing of the level sensor, the length of the housing would need to be extended. This creates additional problems. For example, the level sensing apparatus is a bulky piece of equipment and is often located in areas which have little head space clearance. In such cramped locations, extending the length of the level sensing apparatus is not a feasible option.

Thus, it would be desirable for a level sensing apparatus to be amenable for attachment to a sounding tube in order to accurately and reliably measure the level of contents in storage tanks. It would also be desirable for the level sensing gauge to be easily removable for thief sampling without requiring complete, physical detachment of the gauge from the sounding tube. Further, it would be desirable for the apparatus to allow for operation in areas with low head space clearance.

SUMMARY OF THE INVENTION

The present invention improves aforementioned primary contact methods of level measurement and methods of purity measurement by using a non-contact level sensing gauge apparatus on a sounding tube to measure liquid levels in fuel tanks. The level sensing apparatus of the present invention is adapted to allow the radar level sensor to be moved relative to the sounding tube such that a thief sampler may be inserted into the sounding tube.

There are several types of level sensing gauges. Examples include those that use radar transmitters, or ultrasonic waves. A high degree of accuracy has been achieved by the use of level sensing gauges which monitor content levels by transmitting microwave pulses from an antenna toward the surface of the tank contents. These pulses are reflected from the contents and back to the antenna Other radar gauges use a continuous wave rather than pulses. Radar signals are unaffected by noise, by extreme air turbulence, or by fluctuations in dielectric constant above a nominal minimum value, density, or conductivity. Even liquids having highly agitated surfaces or gas bubbles are usually reliably measured. Gas layering such as that produced by solvents or gases has virtually no adverse effect. Radar sensors are suitable for liquids, solids, powders, granules, dust, corrosive steam and vapors, regardless of the media characteristics, environment, low and high pressures or temperatures. As such, they are adequate for use in the sensing of the fuel level in tanks of Naval ships.

However, as related in the background of the invention, when level sensing gauges are attached to a sounding tube, problems arise when attempting to measure the purity of the contents of the storage tank. For example, removal of the level sensing gauge from the sounding tube in order to use a thief sampler is unwieldy and time consuming and can result in damage to the radar level sensor as well.

The present invention permits level measurement of fuel tanks on Naval ships through the use of a level sensing gauge while providing simple secondary access for purity measurement that does not require complete removal of the radar instrument from the sounding tube. Rather, the housing of the radar instrument swivels away from the sounding tube, while remaining operatively connected thereto, to allow thief sampling. Because the motion of the radar instrument is along a horizontal plane, the present invention is not susceptible to problems with space requirements resulting from low clearances over the sounding tube, since it minimizes extensions of the apparatus in a vertical direction. Thus, the present invention allows for measurement of the purity of contents in a tank, without affecting the accuracy of liquid level measurement, and while reducing or eliminating the other aforementioned reliability and service drawbacks of apparatus and methods of prior art.

The level sensing apparatus of the present invention includes four main components: (1) the radar level sensor itself, (2) a sounding tube adapter, (3) a lock, and (4) a swivel connector. The level sensor includes a housing having a transmitter cover and an antenna shield with a transmitter disposed within the transmitter cover and an antenna which is operatively connected to the transmitter and disposed within the antenna shield. The transmitter emits electrical and/or mechanical waves through the antenna These waves are subsequently reflected from a surface and received by the antenna to measure the level of a certain substance, such as fuel, in a given container. In a radar level sensing gauge, the microwave pulses of radar travel down a waveguide and are subsequently reflected off the contents of the tank and return to the antenna via the waveguide. In the present invention, the sounding tube is used as a waveguide. The sounding tube adapter is operatively connected to the base of the housing of the radar level sensor. The side of the sounding tube adapter distal to the housing of the radar level sensor is operatively connected to a sounding tube.

The radar level sensor is operatively connected to the sounding tube adapter by the lock and swivel connector. The lock is disposed circumferentially about the sounding tube adapter and is adapted to receive the housing of the radar level sensor. The lock includes first and second handles on opposite sides of the lock. When these handles are placed in a locked position, their ends are received by an annular groove disposed in the sidewall of the housing. In this position, the housing of the radar level sensor abuts and is held in substantial axial alignment with the sounding tube adapter. The swivel connector also aids in positioning the radar level sensor. The swivel connector is an extendible and rotatable shaft having a first end attached to the housing of the level sensor. The second end of the shaft is attached to either the cam lock or the sounding tube adapter. In this manner, the level sensor may be moved out of or into alignment with the sounding tube adapter to be operatively connected thereto.

The level sensing apparatus, which includes the level sensor and sounding tube adapter, may then be mounted to a sounding tube through the use of a union fitting. The union fitting is threaded, including female threads which are compatible with the male threads of the sounding tube. A gasket in the union fitting forms a seal between the top of the sounding tube and the apparatus.

Thus, in accordance with the present invention, when the radar level sensor is received by the cam lock in substantial axial alignment with the sounding tube adapter, the pulse radar of the level sensing gauge travels the sounding tube unimpeded, thereby resulting in a very accurate and reliable reading of the fluid level. The lock and swivel connector obviate the need for removing the level sensing gauge from the sounding tube in order to measure the purity of the fluid. Rather, when the handles of the lock are moved to their unlocked position, the housing of the radar level sensor my be lifted and swivelled away from the sounding tube by its cooperative movement with the extendible and rotatable shaft to which it is attached. Following the collection of a thief sample, the housing may be returned to alignment with the sounding tube adapter and immobilized by moving the handles of the lock to their locked position. This eliminates a cumbersome and time consuming process and additionally reduces or eliminates the other drawbacks of the prior art described above.

By virtue of the foregoing, there is thus provided an apparatus and method for liquid level measurement in a sounding tube and for measurement of the purity of contents in a tank. The aforementioned and other advantages of the present invention shall be apparent from the accompanying drawings and description thereof.

DETAILED DESCRIPTION

Figures 1, 2:
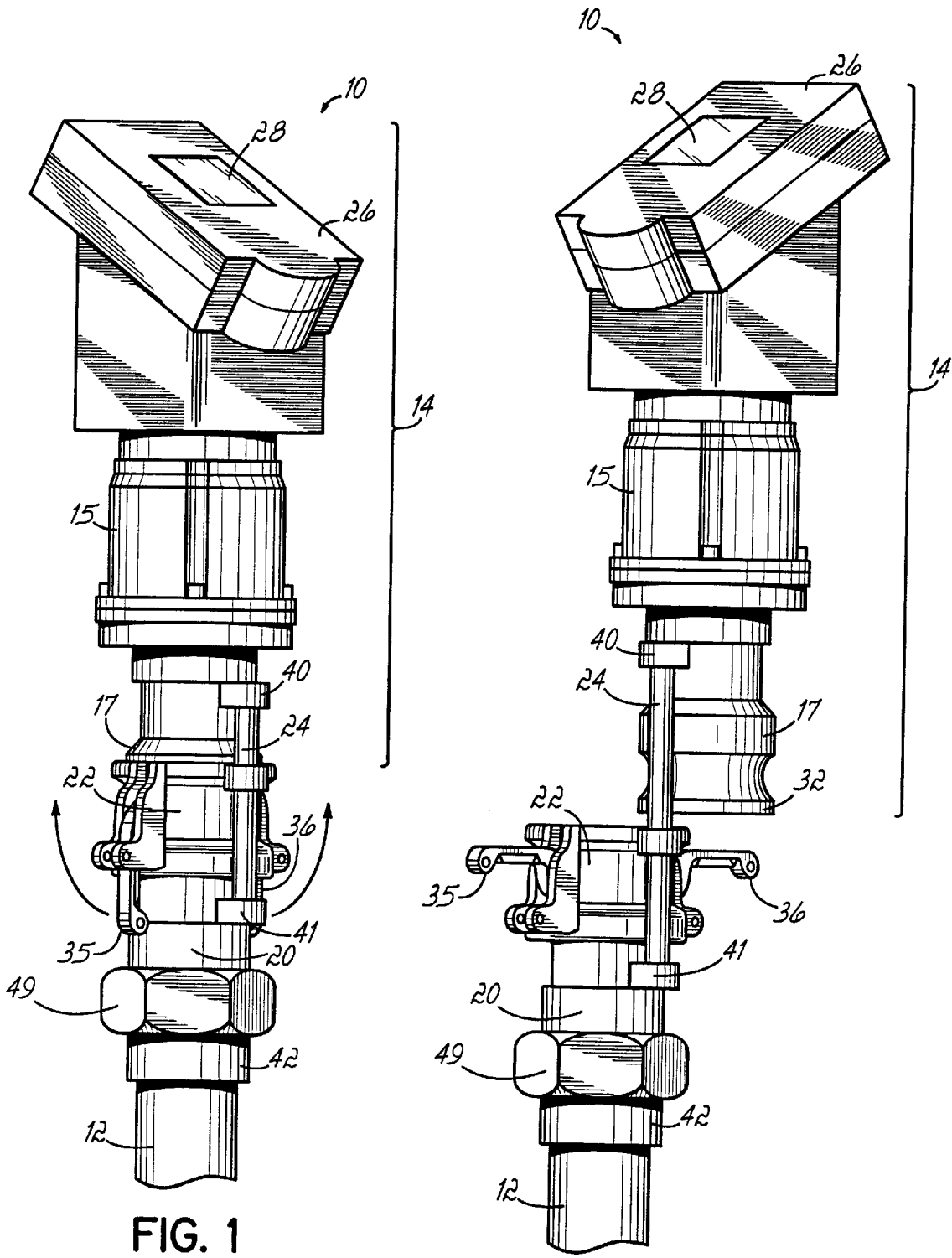
FIG. 1 is a perspective view of the level sensing apparatus of the present invention attached to a sounding tube, depicting the cam lock and swivel connector of the level sensing apparatus in a locked position.
FIG. 2 is a perspective view of the level sensing apparatus of the present invention depicting the cam lock in an unlocked position and the apparatus swivelled away from a sounding tube.

Referring to the Figures, and in accordance with the principles of the present invention, a level sensing apparatus 10 is provided for attachment to a sounding tube 12 in order to measure levels of contents in a tank 13. This level sensing apparatus 10 includes a housing 14 having a transmitter cover 15 and an antenna shield 17 for enclosing the various components of the level sensing apparatus 10. These components include a transmitter 16 disposed within and attached to the transmitter cover 15 and an antenna 18 disposed within the antenna shield 17 and operatively connected to the transmitter 16 for directing electrical or mechanical waves in a direction away from the transmitter 16. This transmitter 16 may be a microwave transmitter, such as Ohmnart-VEGA part number Vegapuls 54 KEX.MD, commercially available from Ohmart-VEGA, Cincinnati, Ohio. The antenna 18 is further adapted to receive electrical or mechanical waves.

The level sensing apparatus 10 of the present invention also includes a sounding tube adapter 20 operatively connected to the housing 14 and further adapted for attachment to a sounding tube 12. The housing 14 of the level sensing apparatus 10 is operatively connected to the sounding tube adapter 20 by a lock 22, which in the illustrated embodiment of the present invention is a cam lock, and a swivel connector 24. The lock 22 and swivel connector 24 are used to move the housing 14 away from the sounding tube adapter 20, thereby exposing the sounding tube 12 to allow for measurement of the purity of the contents in the tank 13.

More particularly, and referring to FIGS. 1, 2, 2A and 4 the pulse radar level sensing apparatus 10 of the present invention includes an enclosed housing 14, having a transmitter cover 15 and an antenna shield 17 which form a chamber for containing a transmitter 16 and antenna 18 of the apparatus 10. In the illustrated embodiment of the present invention, the housing 14 includes a hinged removable lid 26 for access to the components of the transmitter 16. The housing 14 additionally includes a display screen 28, from which an operator may read the measurement of liquid levels in a tank 13. The transmitter 16 is disposed within and attached to the transmitter cover 15. The antenna 18 is disposed at least partially within the antenna shield 17 and is operatively connected to the transmitter 16. The transmitter 16 generates electrical or mechanical waves used for measurement and the antenna 18 directs these waves in a direction away from the transmitter 16. These waves may be of various types, including radar or ultrasonic waves. In one embodiment of the present invention, microwave radar pulses are used. Other apparatus may use a continuous wave as opposed to radar pulses. Following their transmittal, these waves are reflected off a surface to be measured and subsequently returned to the level sensing apparatus 10. The antenna 18 is adapted to receive these reflected electrical or mechanical waves.

The sounding tube adapter 20 of the level sensing apparatus 10 is operatively connected to and extends from the base 32 of the antenna shield 17. In the illustrated embodiment of the present invention, the entirety of the antenna 18 is disposed within the antenna shield 17. In alternate embodiments, the distal end 33 of the antenna 18 may protrude below the open base 32 of the antenna shield 17 and be sheathed by the sounding tube adaptor 20. The sounding tube adapter 20 includes an annular flange 34 located proximal to the base 32 of the antenna shield 17. This annular flange 34 has application in operatively connecting the sounding tube adapter 20 to the housing 14 of the level sensing apparatus 10 of the present invention. The shape of the flange 34 aids in forming a seal between the housing 14 and sounding tube adapter 20.

In the illustrated embodiment of the present invention, the lock 22 and swivel connector 24 aid in operatively connecting the housing 14 to the sounding tube adapter 20. The lock 22 is disposed circumferentially about the sounding tube adapter 20 and extends therefrom, and is adapted to receive the antenna shield 17 of the radar level sensor. The lock 22 includes first and second handles 35, 36 on opposite sides of the lock 22 one from another. The first and second handles 35, 36 may be placed in a locked (FIG. 1) or an unlocked (FIG. 2) position. When first and second handles 35, 36 are placed in the locked position, an end 37 of the first handle 35 and an end 38 of the second handle 36 are received by an annular groove 39 disposed circumferentially about the sidewall of the antenna shield 17. In this locked position, the antenna shield 17 of the radar level sensor abuts and is held relative to the sounding tube adapter 20 such that the axis of symmetry of the antenna 18 is in substantial axial alignment with the axis of symmetry of the sounding tube adapter 20.

The swivel connector 24 also aids in positioning the housing 14. In the illustrated embodiment, the swivel connector 24 is an extendible and rotatable shaft having a first end 40 attached to the antenna shield 17 of the housing 14 of the radar level sensor. In an alternate embodiment, the first end 40 of the swivel connector 24 may be attached to the transmitter cover 15 or other part of the housing 14. The second end 41 of the shaft may be attached to the lock 22, as in the illustrated embodiment, or may be attached to the sounding tube adapter 20 in alternate embodiments. Thus, the housing 14, including transmitter cover 15 and antenna shield 17, moves cooperatively with the swivel connector 24. In this manner, the radar level sensor may be moved out of axial alignment with the sounding tube adapter 20 to allow for purity measurement or into axial alignment with the sounding tube adapter 20 to be operatively connected thereto to allow for pulse radar liquid level measurement.

Figures 2A, 3:
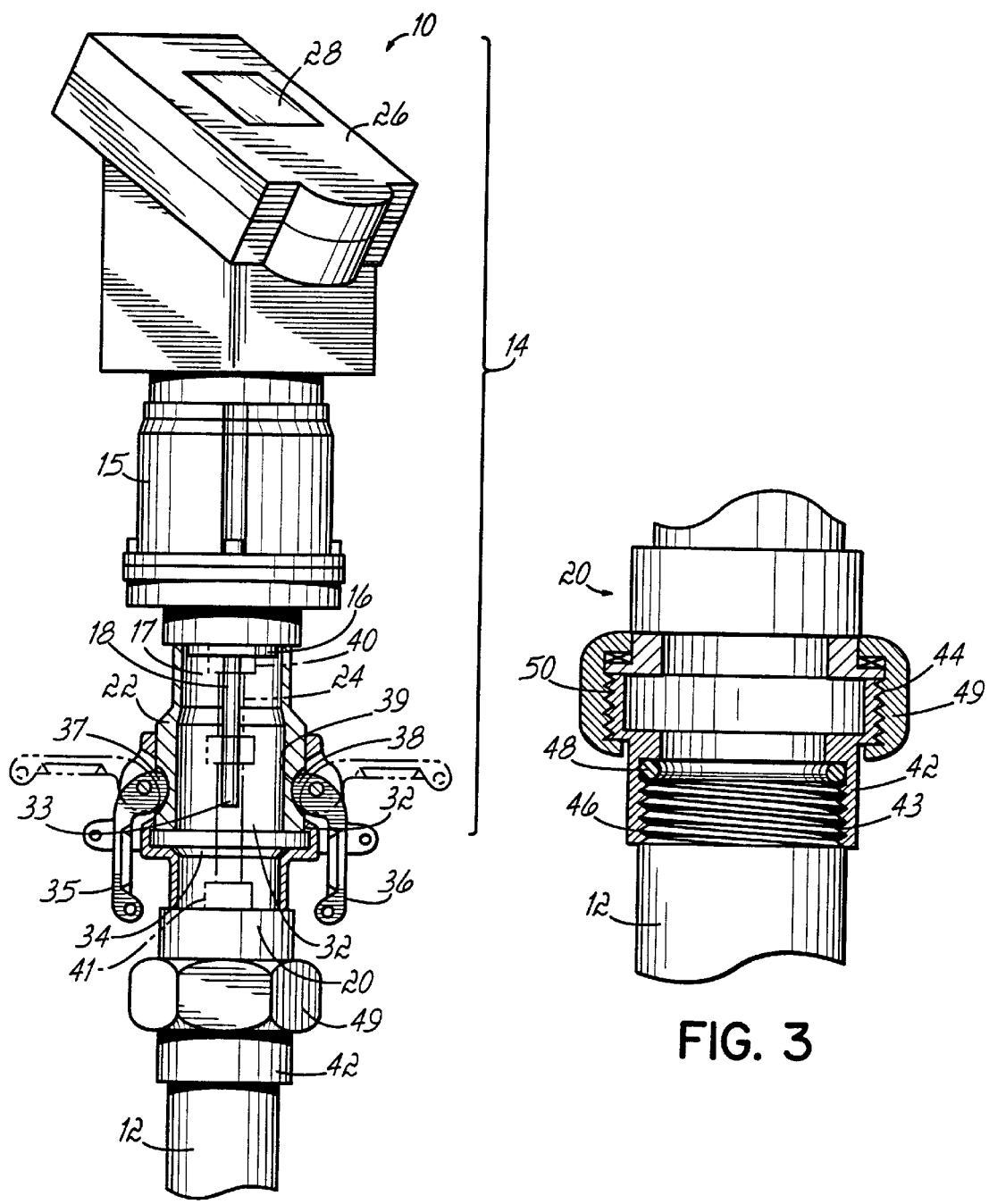
FIG. 2A is a partial cutaway view depicting the level sensing apparatus attached to a sounding tube in accordance with the principles of the present invention.
FIG. 3 is a cutaway view depicting the interaction of the union fitting, sounding tube, and sounding tube adapter in accordance with the principles of the present invention.
Figure 3A:
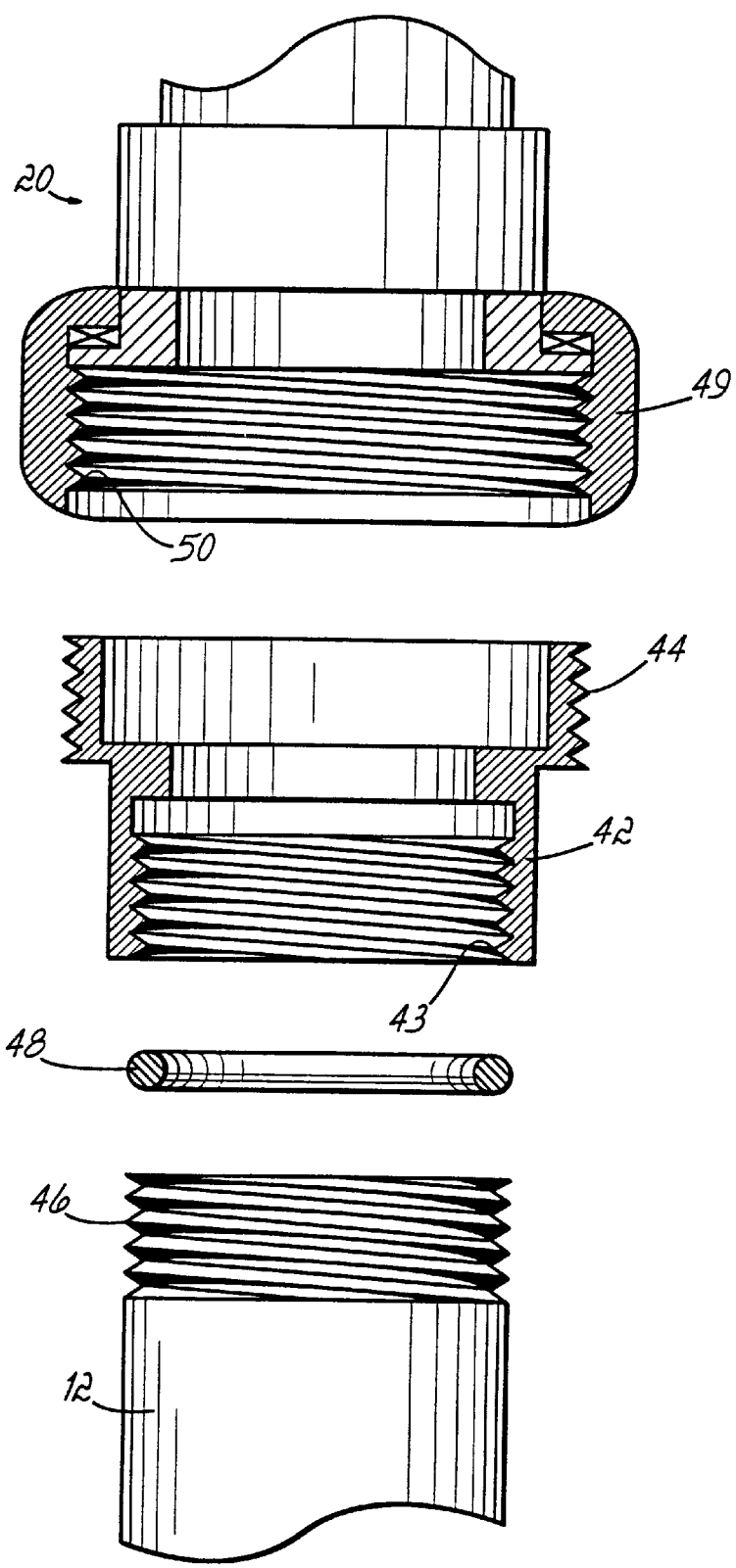
FIG. 3A is a disassembled view of the union fitting, sounding tube, and sounding tube adaptor of FIG. 3.
Figure 4:
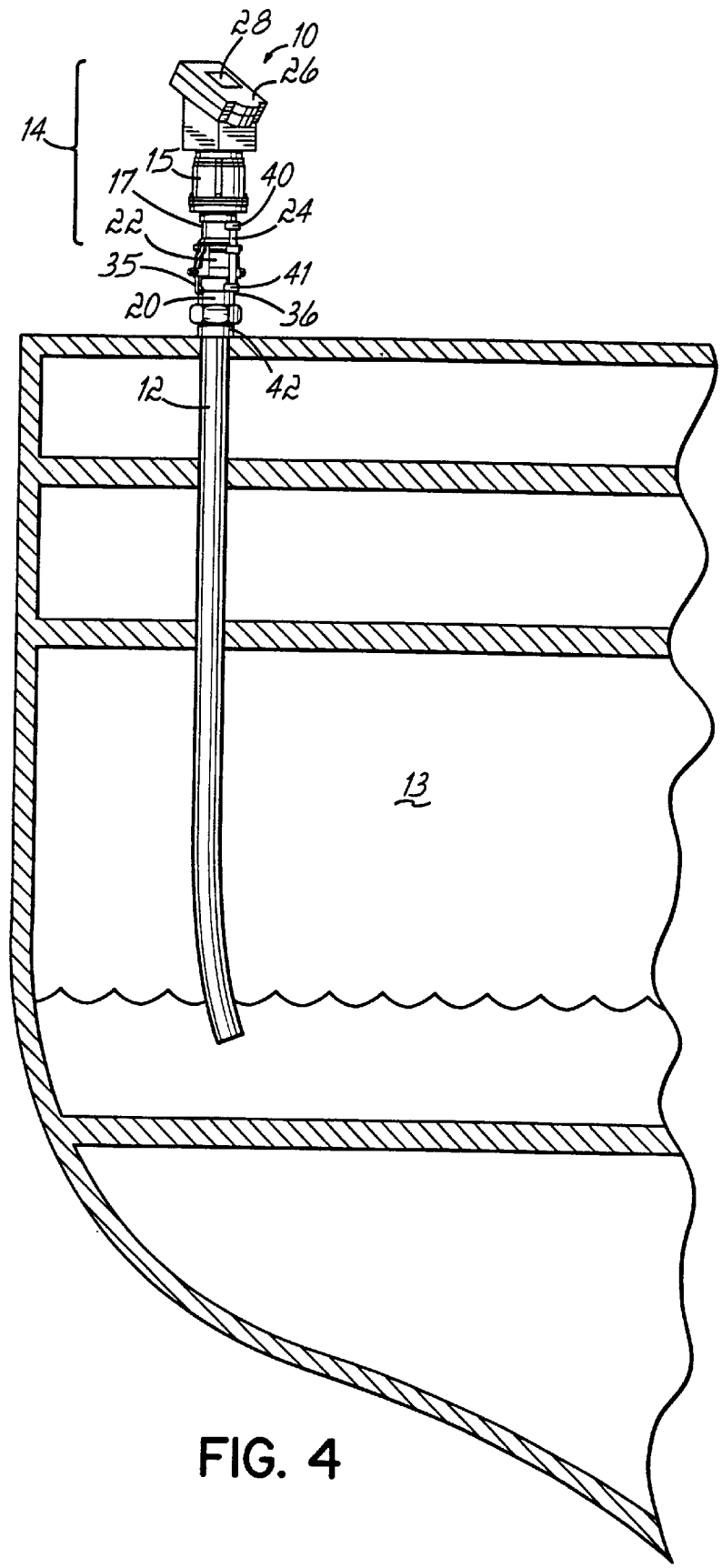
FIG. 4 is a perspective view depicting the level sensing apparatus attached to a sounding tube in accordance with the principles of the present invention.

The attachment of the apparatus 10 to sounding tube 12 is facilitated by a union fitting 42 located at and operatively connected to the end of the sounding tube adapter 20 distal to the housing 14 of the radar level sensor. Referring to FIGS. 3 and 3A, this union fitting 42 is instrumental in the attachment of the level sensing apparatus 10 to a sounding tube 12. The sounding tube 12 to which the level sensing apparatus 10 is attached acts as a waveguide for directing microwave radar pulses into and receiving microwave radar pulses from the contents of the tank 13. Attachment of the level sensing apparatus 10 to the sounding tube 12 occurs through the use of corresponding male and female threads which are disposed on the surfaces of the union fitting 42, sounding tube 12, and sounding tube adapter 20. The union fitting 42 is in the form of an annular collar having an inner circumference 43 and an outer circumference 44. The inner circumference 43 of the distal end of the union fitting 42 is female threaded and is mounted to the compatibly male threaded outer circumference 46 of the top of the sounding tube 12. As the union fitting 42 is screwed onto the end of the sounding tube 12 proximal to the sounding tube adapter 20, a gasket 48 included in the union fitting 42 will tightly seal the union fitting 42 to the top of the sounding tube 12. The gasket 48 is disposed on the union fitting 42 in a position which abuts the end of the sounding tube 12 when the union fitting 42 is attached to the sounding tube 12. In this manner, the gasket 48 forms a tight seal between the union fitting 42 and the sounding tube 12 as the union fitting 42 is attached to the sounding tube 12. This seal aids in preventing leakage of vapors from the storage tank.

Following connection of the union fitting 42 to the sounding tube 12, the sounding tube adapter 20 may be attached to the union fitting 42. Still referring to FIG. 3, a connecting end 49 of the sounding tube adapter 20 most proximal to the union fitting 42 is freely rotatable about the remainder of the sounding tube adapter 20. The inner circumference 50 of this connecting end 49 is male threaded. The outer circumference 44 of the union fitting 42 on the end most proximal to the sounding tube adapter 20 is correspondingly female threaded. As such, the connecting end 49 may be screwed onto the union fitting 42, thereby attaching the sounding tube adapter 20 to the sounding tube 12. Once attached to the sounding tube 12, the measurement of fuel levels within the tank 13 may be read from the display screen 28 disposed in the housing 14 of the level sensing apparatus 10.

Aside from pulse radar measurement, the apparatus 10 of the present invention also allows for measurement of the purity of fuel by the use of a thief sampler, while retaining the accuracy and ease of use of the level sensing apparatus 10 for level measurement. Referring to FIGS. 1, 2, 2A and 4 and in accordance with the principles of the present invention, when the antenna shield 17 of the housing 14 is received by the lock 22 in substantial axial alignment with the sounding tube adapter 20, pulse radar waves travel the sounding tube 12 unimpeded, thereby resulting in a very accurate and reliable reading of the liquid level. The lock 22 and swivel connector 24 obviate the need for removing the radar level sensor from the sounding tube 12 in order to measure the purity of the fuel. Rather, when first and second handles 35, 36 of the lock 22 are moved from the locked position (FIG. 1) to the unlocked position (FIG. 2), the housing 14 is capable of being lifted and swivelled away from the sounding tube by cooperative movement with the extendible and rotatable shaft of the swivel connector 24. Following the collection of a thief sample, the housing 14 may be returned to alignment with the sounding tube adapter 20 and substantially immobilized by moving first and second handles 35, 36 of the lock 22 to their locked position.

More particularly, in order to take pulse radar measurements of liquid levels in a tank 13, the housing 14 is placed in and received by the lock 22. Once disposed within the lock 22, the axis of symmetry of the antenna 18 is in substantial axial alignment with the axis of symmetry of the sounding tube adapter 20. The housing 14 is then substantially immobilized in this position by movement of the first and second handles 35, 36 from the unlocked to the locked position. As the handles 35, 36 move into the locked position, ends 37, 38 of first and second handles 35, 36 are received by the annular groove 39 disposed circumferentially about the antenna shield 17 of the housing 14. In this position, the handles 35, 36 operatively connect the housing 14 to the sounding tube adapter 20, thereby preventing the housing 14 from moving relative to the sounding tube adapter 20 such that the axes of symmetry of the antenna 18 and sounding tube adapter 20 are not substantially aligned.

In order to thief sample the contents of the tank 13 for purity, the housing 14, including transmitter cover 15 and antenna shield 17, must be moved away from the sounding tube adapter 20, thereby exposing the sounding tube 12 for access by a thief sampler. To achieve this result, the handles 35, 36 are first moved from the locked (FIG. 1) to the unlocked (FIG. 2) position. When the handles 35, 36 are in the unlocked position, the ends 37, 38 of first and second handles 35, 36 are disengaged from annular groove 39, and the transmitter cover 15 and antenna shield 17 may be moved cooperatively with the swivel connector 24 to which they are operatively connected. The transmitter cover 15 and antenna shield 17 are then lifted away from the sounding tube adapter 20 as the shaft of the swivel connector 24 is extended. As the transmitter cover 15 and antenna shield 17 are lifted, the axis of symmetry of the antenna 18 disposed within the antenna shield 17 remains in substantial axial alignment with the axis of symmetry of the sounding tube adapter 20. After the transmitter cover 15 and antenna shield 17 have been lifted away from the sounding tube adapter 20, the transmitter cover 15 and antenna shield 17 are then swivelled away from the sounding tube adapter 20 in an arcuate motion cooperative with the rotation of the shaft of the swivel connector 24. When the housing 14 is moved in such fashion, the axis of symmetry of the antenna 18 is moved out of substantial axial alignment with the axis of symmetry of the sounding tube adapter 20. An opening to the sounding tube 12 is thereby exposed.

Once access to the sounding tube 12 has been achieved, a thief sampler may be inserted into the interior of the sounding tube 12, whereby the thief sampler falls by force of gravity into the contents of the tank 13. The thief sampler is then retracted from the sounding tube 12 and a purity measurement of the tank contents may be obtained by measuring the purity of the sample collected by the thief sampler. Following sample collection the housing 14 may be returned to receiving relationship with the lock 22, with the antenna 18 in substantial axial alignment with the sounding tube adapter 20 for liquid level measurement.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while a cam lock is used in the illustrated embodiment of the present invention, those skilled in the art will recognize that other locking mechanisms may be used. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A level sensing apparatus for attachment to a sounding tube to measure levels of contents in a tank, said level sensing apparatus comprising:
   a housing;
   a transmitter disposed within and attached to said housing;
   an antenna disposed within said housing and operatively connected to said transmitter for directing electrical or mechanical waves in a direction away from said transmitter, said antenna further adapted to receive electrical or mechanical waves;
   a sounding tube adapter operatively connectable to said housing, said sounding tube adapter sized for attachment to a sounding tube;
   a lock on said adapter or housing adapted to receive said housing or adapter, respectively; and
   a swivel connector operatively connected to said housing, whereby said swivel connector operates to allow movement of said housing relative to said sounding tube adapter.

2. The apparatus of claim 1 wherein said lock further comprises first and second handles, said first and second handles capable of being moved between a locked position and an unlocked position.

3. The apparatus of claim 2 wherein said housing includes an annular groove disposed circumferentially about said housing, said annular groove adapted to receive an end of said first handle and an end of said second handle.

4. The apparatus of claim 3 wherein said swivel connector is an extendible and rotatable shaft having first and second ends, wherein said first end of said shaft is operatively connected to said housing.

5. The apparatus of claim 4 wherein said second end of said shaft is operatively connected to said lock.

6. The apparatus of claim 4 wherein said shaft is extendible along and rotatable about its axis of symmetry when said first and second handles of said lock are in said unlocked position.

7. The apparatus of claim 6 wherein movement of said first and second handles of said lock from said unlocked position to said locked position results in ends of said first and said second handles being received by said annular groove, thereby causing said housing to be immobilized with its axis of symmetry substantially axially aligned with the axis of symmetry of said sounding tube adapter.

8. The apparatus of claim 6 wherein movement of said first and second handles of said lock from said locked position to said unlocked position results in disengagement of ends of said first and second handles from said annular groove, thereby permitting said shaft to be extended along and rotated about its axis of symmetry, wherein said housing cooperatively moves with said shaft and is thereby moved out of receiving relationship with said sounding tube adapter when said shaft is extended and is moved such that the housing is moved out of alignment with the axis of symmetry of said sounding tube adapter when said shaft is rotated.

9. The apparatus of claim 1 further comprising a union fitting, said union fitting operatively connected to said sounding tube adapter and being adapted to attach said apparatus to a sounding tube.

10. The apparatus of claim 9 wherein said union fitting includes an inner and outer circumference, said union fitting being threaded about its inner circumference.

11. The apparatus of claim 10 wherein said threads correspond to and mesh with threads located about the circumference of said sounding tube.

12. The apparatus of claim 11 further comprising a gasket disposed on said union fitting proximal to the sounding tube when said apparatus is attached to said sounding tube, said gasket forming a seal between said union fitting and said sounding tube.

13. In combination, a level sensing apparatus and a sounding tube, the combination comprising:
    a sounding tube; and
    a level sensing apparatus for attachment to said sounding tube for measuring the level of contents inside said sounding tube, said level sensing apparatus including a housing, a transmitter disposed within and attached to said housing, an antenna disposed within said housing and operatively connected to said transmitter for directing electrical or mechanical waves in a direction away from said transmitter, said antenna further adapted to receive electrical or mechanical waves, a sounding tube adapter operatively connected to said housing, said sounding tube adapter capable of being adapted for attachment to a sounding tube, a lock disposed circumferentially about said sounding tube adapter, said lock adapted to receive said housing, and a connector operatively connected to said housing, said connector operable to allow movement of said housing relative to said sounding tube adapter.

14. The combination of claim 13 wherein said lock further comprises first and second handles disposed on opposite sides of said lock, said first and second handles capable of being moved between a locked position and an unlocked position.

15. The combination of claim 14 wherein said housing includes an annular groove disposed circumferentially about said housing, said annular groove adapted to receive an end of said first handle and an end of said second handle.

16. The combination of claim 15 wherein said connector is an extendible and rotatable shaft having first and second ends, wherein said first end of said shaft is operatively connected to said housing.

17. The combination of claim 16 wherein said second end of said shaft is operatively connected to said lock.

18. The combination of claim 16 wherein said shaft is extendible along and rotatable about its axis of symmetry when said first and second handles of said lock are in said unlocked position.

19. The combination of claim 18 wherein movement of said first and second handles of said lock from said unlocked position to said locked position results in ends of said first and said second handles being received by said annular groove, thereby causing said housing to be immobilized substantially aligned with said sounding tube adapter.

20. The combination of claim 18 wherein movement of said first and second handles of said lock from said locked position to said unlocked position results in disengagement of ends of said first and second handles from said annular groove, thereby permitting said shaft to be extended and rotated, wherein said housing cooperatively moves with said shaft and is thereby moved out of receiving relationship with said sounding tube adapter when said shaft is extended and is moved such that said housing is moved out of alignment with said sounding tube adapter when said shaft is rotated.

21. The combination of claim 13 further comprising a union fitting, said union fitting operatively connected to said sounding tube adapter and being adapted to attach said apparatus to a sounding tube.

22. The combination of claim 21 wherein said union fitting includes an inner and outer circumference, said union fitting being threaded about its inner circumference.

23. The combination of claim 22 wherein said threads are sized to correspond to and mesh with threads about the circumference of said sounding tube.

24. The combination of claim 23 further comprising a gasket disposed on said union fitting proximal to the sounding tube when said apparatus is attached to said sounding tube, said gasket forming a seal between said union fitting and said sounding tube.

25. A method of measuring the level of and determining the purity of contents in a tank, said method comprising the steps of:

providing a level sensing apparatus attached to a sounding tube, said level sensing apparatus having a housing, a transmitter disposed within and attached to said housing, an antenna disposed within said housing and operatively connected to said transmitter for directing electrical or mechanical waves in a direction away from said transmitter, said antenna further adapted to receive electrical or mechanical waves, a sounding tube adapter operatively connected to said housing, said sounding tube adapter capable of being adapted for attachment to a sounding tube, a lock disposed circumferentially about said sounding tube housing or adapter, said lock adapted to receive said adapter or housing, and a connector operatively connected to said housing, said connector operable to allow movement of said housing relative to said sounding tube adapter;

directing said electrical or mechanical waves to a liquid level surface in said sounding tube by the use of said level sensing apparatus;

receiving said electrical or mechanical waves from said liquid level surface in said sounding tube by the use of said level sensing apparatus;

obtaining a corresponding measurement of said liquid level surface from said liquid level apparatus;

removing said housing from said sounding tube;

collecting a sample of contents in said tank; and measuring the purity of said sample.

26. The method of claim 25 wherein said lock includes first and second handles, the method further comprising the step of moving said first and second handles from a locked to an unlocked position.

27. The method of claim 26 further comprising the step of moving said housing such that said housing is not substantially aligned with said sounding tube adapter, thereby exposing the interior of the sounding tube.

28. The method of claim 27 further comprising the step of inserting a thief sampler into the interior of the sounding tube, whereby said thief sampler falls by force of gravity into the contents of the tank.

29. The method of claim 28 further comprising the step of retracting said thief sampler from said sounding tube.

30. The method of claim 29 further comprising the step of obtaining a measurement of the purity of the contents of the tank by measuring the purity of a sample of contents of the tank collected by said thief sampler.

31. The method of claim 30 further comprising the step of moving said housing such that said housing is substantially aligned with said sounding tube adapter and further moving said first and second handles from said unlocked to said locked position to immobilize said housing over said sounding tube adapter, to obtain accurate liquid level measurement by use of said level sensing apparatus.

* * * * *

UNITED STATES PATENT AND TRADEMARK OFFICE
CERTIFICATE OF CORRECTION

PATENT NO. : 6,292,131 B1
DATED : September 18, 2001
INVENTOR(S) : Wilkie et al.

It is certified that error appears in the above-identified patent and that said Letters Patent is hereby corrected as shown below:

Title page,
Item [75], Inventors, "Neil T. Wilke" should be -- Neil T. Wilkie --.

Column 2,
Line 17, "However, may problems arise from" should be -- However, many problems arise from --

Column 3,
Line 36, "to the antenna Other radar" should be -- to the antenna. Other radar --.

Column 4,
Line 62, "sensor my be lifted" should be -- sensor may be lifted --.

Column 5,
Line 28, "adaptor" should be -- adapter --.

Column 6,
Line 28, "adaptor" should be -- adapter --.

Column 5,
Line 48, "Ohmnart-" should be -- Ohmart --.

Column 9,
Line 9, "applicant's" should be -- applicants' --.

Signed and Sealed this

Twenty-eighth Day of May, 2002

Attest:

*Attesting Officer*

JAMES E. ROGAN
*Director of the United States Patent and Trademark Office*